US007281979B2

(12) United States Patent
Luciano, Jr.

(10) Patent No.: US 7,281,979 B2
(45) **Date of Patent: *Oct. 16, 2007**

(54) INTERACTIVE KENO GAMING SYSTEM AND METHOD

(75) Inventor: Robert A. Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 175 days.

This patent is subject to a terminal disclaimer.

(21) Appl. No.: 10/959,905

(22) Filed: Oct. 5, 2004

(65) Prior Publication Data

US 2005/0227753 A1 Oct. 13, 2005

Related U.S. Application Data

(60) Continuation-in-part of application No. 09/665,742, filed on Sep. 20, 2000, now Pat. No. 6,368,214, which is a continuation-in-part of application No. 09/267,126, filed on Mar. 10, 1999, now Pat. No. 6,129,632, which is a division of application No. 08/866,931, filed on May 31, 1997, now abandoned.

(51) Int. Cl.
*A63F 3/06* (2006.01)
*A63F 13/00* (2006.01)

(52) U.S. Cl. ............................ 463/18; 463/17; 463/19; 463/25; 273/269; 273/138.1; 273/138.2

(58) Field of Classification Search ............ 463/16–21, 463/25–28; 273/274, 269, 138.1, 138.2, 273/143 R, 139

See application file for complete search history.

(56) References Cited

U.S. PATENT DOCUMENTS

| | | | | |
|---|---|---|---|---|
| 5,192,076 A | * | 3/1993 | Komori | 463/18 |
| 5,401,024 A | * | 3/1995 | Simunek | 463/18 |
| 5,651,735 A | * | 7/1997 | Baba | 463/18 |
| 5,779,547 A | * | 7/1998 | SoRelle et al. | 463/28 |
| 5,984,779 A | * | 11/1999 | Bridgeman et al. | 463/16 |

FOREIGN PATENT DOCUMENTS

| | | | |
|---|---|---|---|
| GB | 2230373 A | * | 10/1990 |
| GB | 2354179 A | * | 3/2001 |
| WO | WO0033269 | * | 6/2000 |

* cited by examiner

*Primary Examiner*—Benjamin Layno
(74) *Attorney, Agent, or Firm*—Michael A. Kerr; Virtual Legal

(57) ABSTRACT

The present invention includes an interactive keno game method that comprises receiving at least one player selected symbol from a player during a game session. The at least one player selected symbol is drawn from a set of game symbols. The method then proceeds to receive a condition from the player that identifies the player credits applied for each chargeable action. The condition describes the number of credits that are to be played during each chargeable action. Each chargeable action includes the picking of at least one game selected symbol from the set of game symbols. During a game session the chargeable actions are performed more than once. Additionally, if there is a match between the at least one game selected symbol and the at least one player selected symbol the game session is paused. Furthermore, a prize may be awarded to the player when the at least one player selected symbol matches the at least one game selected symbol. During the game session, the player is provided with various opportunities to terminate the game session wherein the game session outcome is achieved at least in part by the player's skill. Additionally, the interactive keno game may be terminated because the game rules require ending the game session or the player has insufficient credits to continue the game session.

20 Claims, 8 Drawing Sheets

Look-up Table for Ball 1

260

| | | | | | | | | | |
|---|---|---|---|---|---|---|---|---|---|
| 0 | 20 | | | | | | | | 1-Spot |
| 0 | 0 | 0 | | | | | | | 2-Spot |
| 0 | 0 | 0 | 0 | | | | | | 3-Spot |
| 0 | 0 | 0 | 0 | 0 | | | | | 4-Spot |
| 0 | 0 | 0 | 0 | 0 | 0 | | | | 5-Spot |
| 0 | 0 | 0 | 0 | 0 | 0 | 0 | | | 6-Spot |
| 0 | 0 | 0 | 0 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

Look-up Table for Ball 2

270

| | | | | | | | | | |
|---|---|---|---|---|---|---|---|---|---|
| 0 | 21 | | | | | | | | 1-Spot |
| 0 | 0 | 1100 | | | | | | | 2-Spot |
| 0 | 0 | 81 | 0 | | | | | | 3-Spot |
| 0 | 0 | 22 | 0 | 0 | | | | | 4-Spot |
| 0 | 0 | 0 | 0 | 0 | 0 | | | | 5-Spot |
| 0 | 0 | 0 | 0 | 0 | 0 | 0 | | | 6-Spot |
| 0 | 0 | 0 | 0 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

Look-up Table for Ball 3

280

| | | | | | | | | | |
|---|---|---|---|---|---|---|---|---|---|
| 0 | 21 | | | | | | | | 1-Spot |
| 0 | 0 | 562 | | | | | | | 2-Spot |
| 0 | 0 | 42 | 22800 | | | | | | 3-Spot |
| 0 | 0 | 11 | 1300 | 0 | | | | | 4-Spot |
| 0 | 0 | 0 | 430 | 0 | 0 | | | | 5-Spot |
| 0 | 0 | 0 | 140 | 0 | 0 | 0 | | | 6-Spot |
| 0 | 0 | 0 | 46 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

FIG. 9

INTERACTIVE KENO GAMING SYSTEM AND METHOD

CROSS REFERENCES TO RELATED APPLICATIONS

This patent application is a continuation-in-part of patent application Ser. No. 09/665,742 now U.S. Pat. No. 6,368, 714 entitled "Method and Device for Playing Game in which a Player is Charged for Performing Game Playing Action" which is a CIP of U.S. Pat. No. 6,129,632, which is a divisional of application Ser. No. 08/886,931 filed on May 31, 1997, now abandoned.

This patent application is related to patent application 10/214,862 filed on Aug. 7, 2002, titled "INTERACTIVE KENO GAMING SYSTEM AND METHOD," which is related to patent application 10/041,940 filed on Oct. 17, 2001 (now abandoned), titled "INTERACTICE KENO GAMING SYSTEM AND METHOD," which is related to patent application 09/665,742 entitled "METHOD AND DEVICE FOR PLAYING GAME IN WHICH A PLAYER IS CHARGED FOR PERFORMING GAME PLAYING ACTION," filed on Sep. 20, 2000 (now U.S. Pat. No. 6,368,214) which is related to patent application 09/267,126 filed on Mar. 10, 1999 (now U.S. Pat. No. 6,129,632) which is related to patent application 08/866,931 filed on May 31, 1997 (now abandoned), all of which are hereby incorporated by reference.

BACKGROUND OF THE INVENTION

1. Field of Invention

The present invention is a gaming system and method for an interactive keno-style game. More particularly, the present invention provides an interactive game environment that allows a player to control a plurality of game parameters.

2. Description of Related Art

Keno can be played using paper tickets (similar to Bingo) and a common board used by multiple players. In this version of the game, a player marks a ticket with a crayon to indicate game number selections. The player then registers the ticket with an employee at the keno desk of a casino. This ticket is then played against the next featured game displayed on the common board, with each player playing independent tickets. The common board merely lights up the twenty random numbers that are selected using numbered ping pong balls (similar to the lottery). The player then reviews the ticket and circles the numbers that the player selected and the numbers that were randomly selected and displayed on the common keno board. When the randomly selected numbers are the same as a player selected number, this is known as a "hit". If the player received enough hits, as determined by the payout schedule, the player takes the winning ticket to the employee at the keno desk for his payoff.

In video Keno a player selects numbers from a grid of eighty squares, with each square numbered from one to eighty in sequence. The player first determines how many numbers (or "spots") to select. The number of spots selected determines the payout odds. For example, for a five-spot keno game the player selects any five of the eighty numbers and marks them. Then, the machine selects at random, twenty of the eighty numbers. If the player received enough hits to have a winning ticket, the machine then pays off according to an established paytable schedule.

More sophisticated pennutations of keno have also been developed. For example a pattern keno game was invented by Margolin and described in U.S. Pat. No. 5,813,911. The method comprises preparing a template from a pattern of squares selected by a player and then generating a random selection of squares on the playing board by the game. The template is then overlaid over the playing board in each possible position where the template is included. Then the number of randomly selected squares that are contained within the template counted. A payout for each position is determined that totals the payout derived from each of the winning positions and crediting the payout to the player.

In each of the keno games described above the keno game operates in a relatively static environment that requires little player input. For example, once the player selects the game numbers to play, the player is left to simply wait for the random selection of numbers to determine whether the player is awarded a prize. This type of game lacks excitement because of the limited degree of player interactivity.

Therefore, a gaming system and method is needed that increases the enjoyment of a keno game by creating a more interactive environment where the player is more actively involved in the wagering process. In order to make the keno game more interactive, a keno-style game that permits the player to dynamically change the amount wagered is needed. Additionally, a keno-style game that permits the player to have limited control of the prize awarded is needed to provide a highly interactive entertaining experience.

SUMMARY OF INVENTION

The present invention includes an interactive keno game method that allows a player to control at least three game parameters: the player selected symbols, the number of player credits wagered for each chargeable action, and the opportunity to determine when to end the game session. More particularly, the method includes receiving at least one player selected symbol from the player during a game session. A game session requires the picking of at least one game selected symbol from a set of game symbols more than once. The at least one player selected symbol is chosen from a set of game symbols. In one illustrative embodiment, the set of game symbols are integers ranging from 1 through 80. According to the illustrative embodiment, the player selected symbols include up to 10 game symbols that are chosen from integers ranging from 1 through 80.

The method also provides for the receiving of a condition from the player that identifies the player credits applied for each chargeable action. The chargeable action includes the picking of at least one game selected symbol from the set of game symbols and charging of the player at least one player credit. The chargeable action is performed more than once. In the illustrative embodiment, if the condition selected by the player is 10 credits, then 10 credits are wagered each time at least one game selected symbol is picked.

Additionally, if there is a match between the at least one game selected symbol and the at least one player selected symbol, the game session is paused. A prize may be awarded to the player when the at least one player selected symbol matches the at least one game selected symbol. Prizes awarded to the player during the game session may be also be applied toward the game session.

The basis for awarding a prize is made with a paytable that determines if a prize is awarded to the player. A prize is awarded when the at least one game selected symbol matches the at least one player selected symbol. Preferably, the paytable is displayed so that the player can determine whether to continue the game session. Thus, the player is provided with an opportunity to terminate the game session and minimize the player's losses. The opportunity to terminate the game session creates a skill component in which the game session outcome is at least in part by the player's skill. In operation, the paytable may be revised after each chargeable action. Additionally, the paytable may be revised according to a total number of player credits wagered during a game session. Further still, the paytable may be revised according to a formula having a weighted probability that is dependent on the total number of player credits played during the game session.

During a game session, a command is communicated to the interactive keno gaming system to terminate the game session. The command may be generated by the interactive keno game after the player has been awarded a prize, or if the player has no more credits. The command may also be generated by the player after one of the chargeable actions takes place or after the paytable is revised or at any other time during the game session. As previously mentioned, the game provides the player with an opportunity to terminate the game session, thereby adding an interactive skill component to the interactive keno game method.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Embodiments of the present invention are shown in the accompanying drawings:

FIG. 9 is an illustrative example of look-up paytables.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1A:
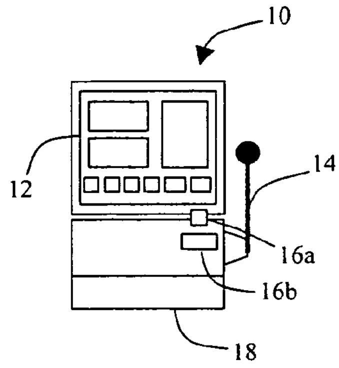
FIG. 1*a* is an illustrative stand alone device having the gaming system and method of the present invention.

Referring to FIG. 1*a* there is shown an illustrative stand alone device 10 configured to provide an interactive keno gaming system and method. In the illustrative embodiment, the stand alone device 10 is an electronic device that has a touch screen video display 12 which acts as a player interface. The electronic device includes a dedicated gaming device, a computer having interactive keno gaming software, a personal digital assistant, or any other such device or combination of devices that displays the interactive keno game of the present invention. As shown, the illustrative stand alone device 10 also includes a handle 14 that acts as a player interface component. The function of handle 14 may be similar to the function of a handle in a conventional slot machine.

Additionally, the illustrative stand alone device 10 includes a monetary input component that is configured to receive money or transferable credits, respectively. The illustrative monetary input component 16*a* is a device adapted to receive coins. The illustrative monetary input component 16*b* is a device adapted to receive transferable credits. The transferable credits may be provided by a coupon based system. Other monetary input components may be configured to receive bills, credit cards, debits cards, smart cards, electronic currency and other such means for transferring money or credits.

A coin hopper 18 is used to distribute an award to the player. It shall be appreciated by those skilled in the art that any other components for distributing awards may also be used instead of the coin hopper 18. These other components for distributing awards include a paper coupon, a smart card, a mag stripe card, or any other such means that can record the transfer of money or credits to the player.

Figure 1B:
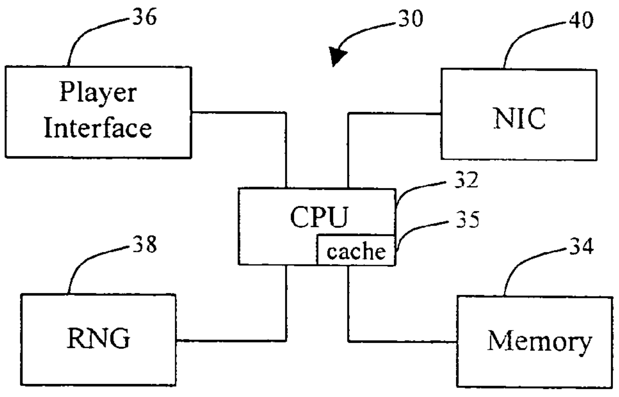
FIG. 1*b* is an illustrative block diagram of the system for the stand alone device having the gaming system and method of the present invention.

Referring to FIG. 1*b* there is shown an illustrative block diagram of the system for the stand alone device 10. The system 30 for the stand alone 10 device includes a logic component that is operatively coupled to internal components that manage the various gaming systems and operations for the interactive keno game. In one embodiment, the electronic device may be a computer in which the logic component is a central processing unit (CPU) 32 and a memory 34 that stores the gaming operations and processes of the interactive keno game. A fast memory cache 35 may also be employed by the CPU 32 to more efficiently access data or software stored in the memory 34. It shall be appreciated by those skilled in the art that the memory cache is a memory that is resident on the CPU 32. Additionally, it shall be appreciated by those skilled in the art that logic component does not have to be a CPU and may include a plurality of logic gates and switches that are either programmed, e.g. a field programmable gate array, or may be an application specific integrated circuit (ASIC).

Additionally, in the illustrative embodiment a player interface 36 is operatively coupled to the CPU 32. As previously described the player interface 36 may include a touch screen video display 12 and a handle 14. Alternatively, the player interface 36 may also include a video display (not shown) having a plurality of switches (not shown) that permit the player to interact with the stand alone device 10. Another alternative player interface 36 is a computer monitor (not shown) having a keyboard or mouse (not shown). Preferably, the player interface includes a monetary input component as described above. Thus, the player interface 36 includes any interface that permits the player to interact with the stand alone system and input desired gaming parameters.

In an illustrative embodiment, a random number generator 38 is also operatively coupled to the CPU 32. The random number generator 38 is used in the selection of at least one game selected symbol from a set of game symbols during a game session. The game session is defined as a period during which the at least one game selected symbol is picked from the set of game symbols more than one time. The set of game symbols includes numbers, letters, geometric figures, animated figures or any combination thereof. In the illustrative embodiment, the random selection of a game selected symbol involves generating a random number and comparing the random number to a table that randomly picks at least one game selected symbol from within the set of game symbols. Preferably, the set of game symbols are integers ranging from 1 through 80. Alternatively, the set of game symbols includes integers ranging from 1 through 40, or from 1 through 60, or from 1 through 100. It shall be appreciated by those skilled in the art that the random number generator may be a software program that is stored in the memory 34 and processed by CPU 32. Alternatively, the random number generator may be a separate stand alone module having a robust architecture that is not subject to tampering or environmental interference. Alternatively, the picking of at least one game selected symbol from the set of game symbols may be simulated using system and methods that provide the appearance of a random selection.

Alternatively, the stand alone device 10 may include a network interface card (NIC) 40 that permits the stand alone device 10 to communicate with a plurality of other devices configured to play the interactive keno game. The NIC 40 uses well known networking protocols to communicate with other networked devices. These well known protocols include Ethernet type protocol, TCP/IP protocols or other such network protocols. In an alternative embodiment, the stand alone devices are networked to provide access to a progressive jackpot. The progressive jackpot is a shared jackpot generated from the network of game devices.

Figure 2:
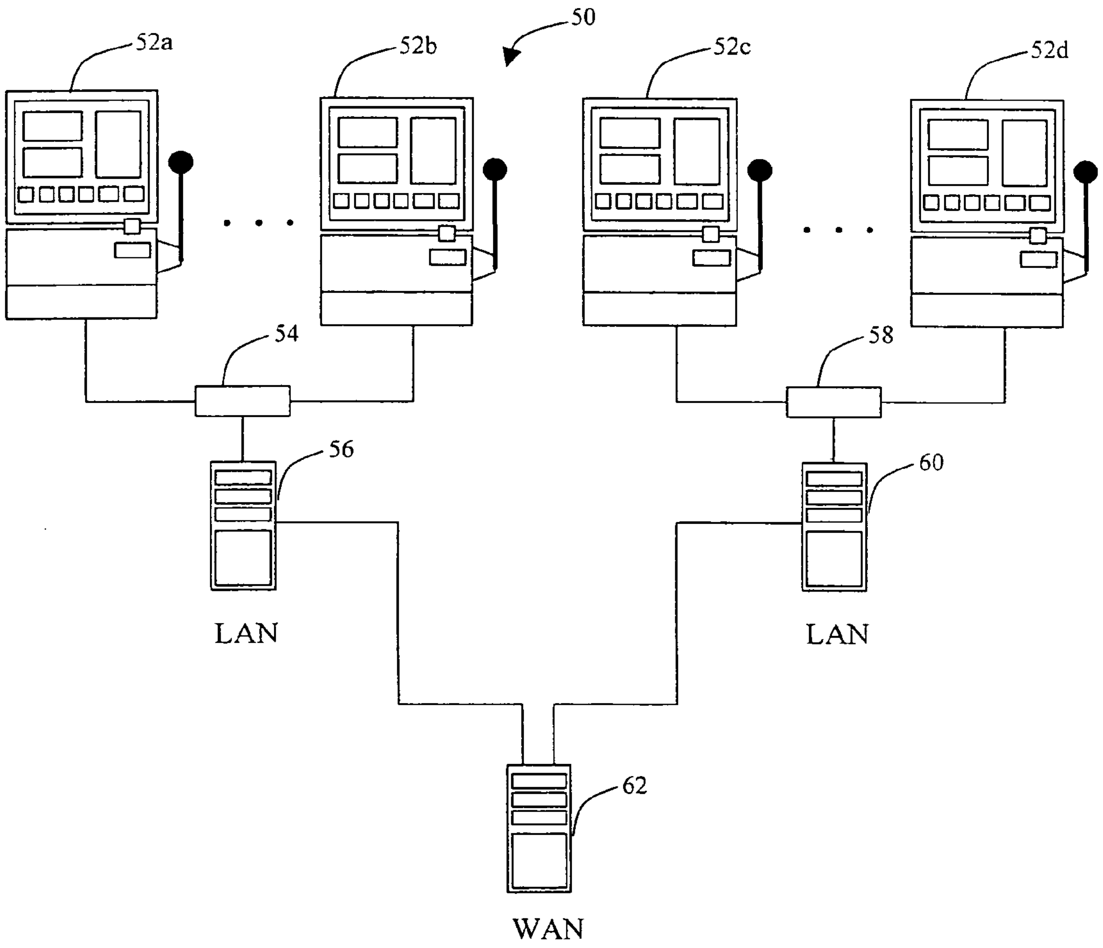
FIG. 2 is an illustrative network comprising a plurality of stand alone devices.

Referring to FIG. 2 there is shown an illustrative network system 50 having a plurality of networked devices 52*a* through 52*d*. Preferably, the networked devices 52*a* through 52*d* are similar to the stand alone device 10. In the illustrative network system 50, the networked devices 52*a* through 52*b* are operatively coupled to a node 54 that communicates with a local area network (LAN) server 56. Additionally, the networked devices 52*c* through 52*d* are also operatively coupled to a node 58 that is communication with a LAN server 60. The nodes 54 and 68 may be a hub, router, bridge, gateway or any combination thereof that allows communications between the networked devices. It shall be appreciated by those skilled in the art that each LAN may operate independently of the other.

A wide area network (WAN) is created by linking the LANs together. For illustrative purposes only, both LAN communicate with a WAN server 62. For purposes of this disclosure, it can be appreciated that the distinction between a LAN and WAN is primarily geographic in nature. The LAN is geographically limited to a bank of stand alone devices that may be resident on the casino floor. A WAN permits banks of networked devices from different casinos to be networked. A primary purpose for networking the gaming devices is to generate a progressive jackpot.

Additional reasons for networking include accounting, diagnostics, player tracking and loyalty programs.

An alternative embodiment to the illustrative network system 50 comprises having the game logic for the interactive keno game resident on a central server. The central server may be either the LAN server 56 or WAN server 62. During game play, the server then communicates game outputs to the appropriate client, i.e. one of the networked devices 52*a* through 52*d*. Yet another embodiment includes having the central server pick the game selected numbers and submit the game selected numbers to each of the clients on the network.

Figure 3:
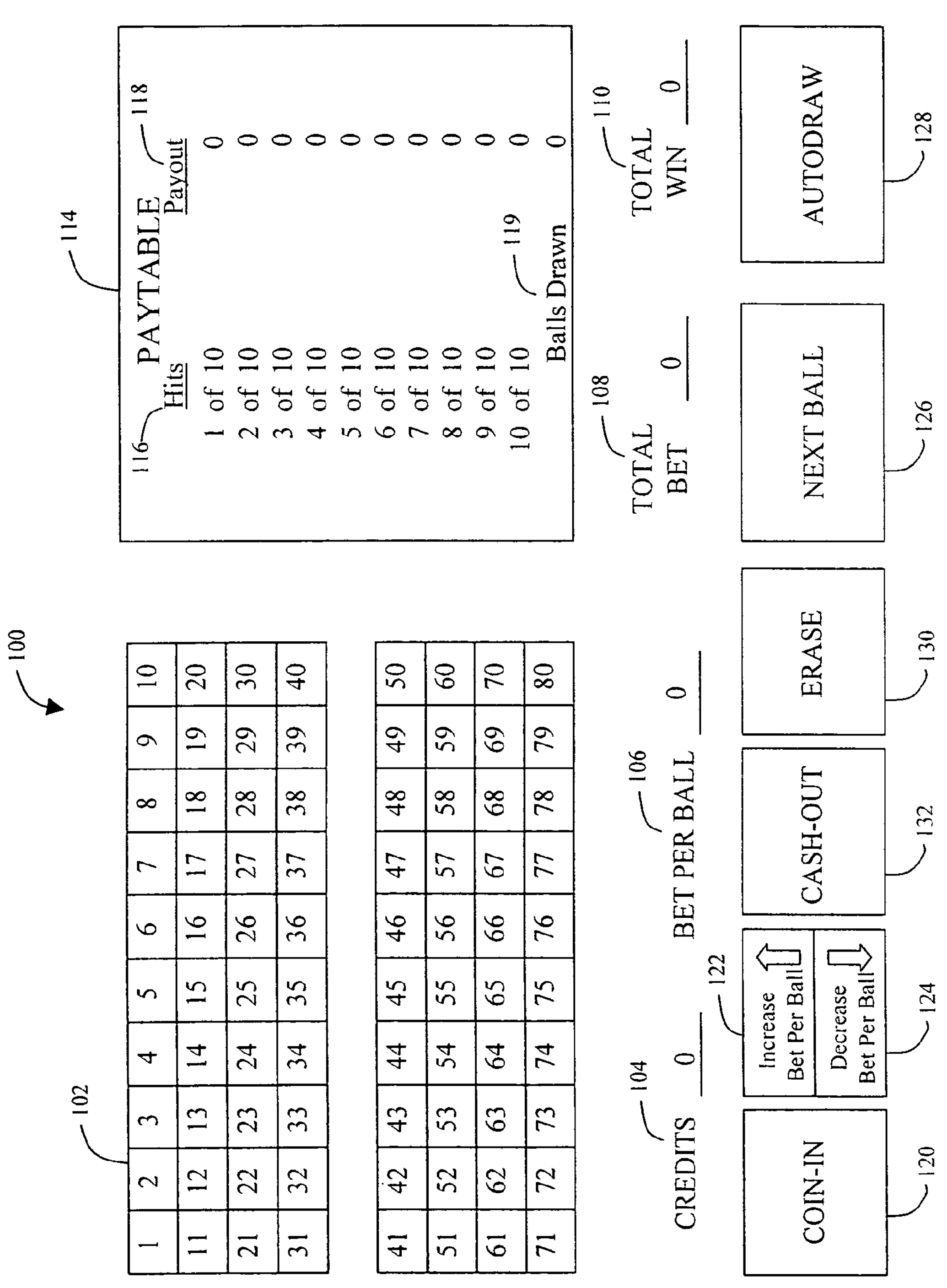
FIG. 3 is an illustrative player interface for the interactive keno game that has not been configured by a player.

Referring now to FIG. 3 as well as FIG. 1, there is shown an illustrative player interface 100 for the interactive keno game. The illustrative player interface 100 is the touch screen display 12 of FIG. 1. The touch screen 12 displays the interactive keno game that is configurable by the player.

Preferably, the interactive keno game displays one game session at a time. During each game session the player identifies at least one player selected symbol. The game session requires the picking of at least one game selected symbol from the set of game symbols more than once. Each game session is made up of at least two game events. During each game event at least one game selected symbol is picked from a set of game symbols. The player is charged at least one credit for each game event, and this process is referred to as a “chargeable action.” A chargeable action is performed during each game event. The set of game symbols includes numbers, letters, geometric figures, animated figures or any combination thereof. Preferably, the set of game symbols are integers ranging from 1 through 80 that represent a standard keno card. Alternatively, the set of game symbols includes integers ranging from 1 through 40, or from 1 through 60, or from 1 through 100.

In the illustrative embodiment, a game session is initiated when the player provides money or transferable credits. For purposes of this patent application, the receiving of either money or transferable credits is also referred to as the receiving of player credits. The money or transferable credits, i.e. player credits, are transferred to the interactive keno gaming system using monetary input components 16*a* or 16*b*, respectively. Once player credits are received by the interactive gaming system, the game session is initiated and a card component 102 is displayed. Additionally, the player credits are displayed as available credits by a credit meter 104.

After the card component 102 is displayed and the player credits are displayed by the credit meter 104, the player identifies the credits that will be applied towards each “chargeable action” with a “Bet Per Ball” meter 106. In the well-known prior art keno game, a player places a wager and selects his numbers, and the game randomly selects 20 numbers. In the present invention, the player is charged a predefined number of credits for each “ball”, i.e. game selected symbol, that is picked. The “Bet Per Ball” meter 106 identifies the condition which determines the predefined number of credits that will be charged for each game selected symbol that is picked. It shall be appreciated by those skilled in the art of the design of games of chance, that the condition described herein permits the player to terminate the game session before the game rules end the game session. The prior art keno game teach that once a game session is initiated, the player can not control the termination of the game session.

The game session is a period of time during which at least one game selected symbol is picked from the set of game symbols more than once. In consideration for the performance of each game event, the player is charged according to the "Bet Per Ball" meter 106. The charging of a player for each game event is referred to as a "chargeable action". Therefore, during each gaming event a chargeable action is performed. Preferably, during the game session, the credit meter 104 is decremented for each chargeable action. At least two gaming events occur during each game session and thus at least two chargeable actions are performed during the game session. The chargeable actions are performed repeatedly during the gaming session such that the term "repeatedly" refers to the chargeable actions occurring more than once during a game session.

During the game session, a total bet meter 108 provides a summary of the total number of credits wagered by the player during a game session. Thus, the credits that are applied for each chargeable action during a game session are monitored with the total bet meter 108. A total win meter 110 is also provided. The total win meter 110 informs the player of the number of credits that player has been awarded during the game session.

Thus, illustrative player interface 100 includes a plurality of meters that monitor each interactive keno game session. In the illustrative embodiment, the meters are used to monitor the various game parameter during each game session. These meters include: the credit meter 104 that displays the number of player credits available for use by the player; the bet per ball meter 106 that displays the condition having the player defined credits for each chargeable action; the total bet meter 108 that monitors the total number of credits wagered by the player during a game session; and the total win meter 110 that informs the player of the total number of credits the player has been awarded during the game session.

A paytable 114 to the right of card component 100 indicates the possible prizes that may be awarded to the player. The paytable includes a dynamic paytable or a static paytable. The dynamic paytable is a paytable that is modified during the game session. By way of example and not of limitation a dynamic paytable may be modified as a function of variables that include: the number of player selected symbols; the number of matching game selected symbols; the amount of player credits played for each chargeable action; the number of chargeable actions performed; the remaining game symbols after each drawing; the total number of game symbols; and the contribution or allocation of each award level to the overall payback. The static paytable is a paytable that does not change during a game session. By way of example and not of limitation, the static paytable refers to a paytable that does not change after the player has chosen the player selected symbols.

In one illustrative embodiment, the paytable 114 is a dynamic paytable that changes each time the player makes a wager. As described above, the paytable may be generated as a function of one or more of these variables or as a combination of these variables and additional variables that have not been mentioned. In the illustrative embodiment of FIG. 3, the paytable 114 is configured to provide a payout for up to 10 player selected numbers. Additionally, it is preferable that the paytable 114 is comprised of a hits column 116 and a payout column 118. The hits column 116 describes the number of hits needed to receive the payout shown in payout column 118. Furthermore, a balls drawn meter 119 captures an output of the quantity of "balls" or game selected symbols. More particularly, the balls drawn meter 119 keeps track of the quantity of game selected symbols picked from the set of game symbols.

Before initiating game play, the player must have available credits in the credit meter 104. Credits are transferred to the credit meter using the coin-in button 120. The coin-in button 120 converts money or credits received from the monetary input component 16*a* or 16*b* to player credits for game play. Additionally, before initiating game play the player must transfer credits from the credit meter 104 to the bet per ball meter 106 and provide the condition for each chargeable action conducted during the game session. The player transfers credits from the credit meter 104 using the increase bet per ball button 122 or the decrease bet per ball button 124. The increase bet per ball button 122 increases the number of credits that are shown by the bet per ball meter 106 and the decrease bet per ball button 124 decreases the number of credits that are shown by the bet per ball meter 106. According to one embodiment, during the game session the player may change the amount wagered for each chargeable action. The ability to change the amount wagered during the selection of game selected numbers provides a heightened level of player interactivity.

Once the game session has begun and the player has provided the condition that identifies the chargeable action, and the player selects one Or more player selected symbols from the set of game symbols. In one illustrative embodiment, up to 10 player selected integers ranging from 1 through 80 may be identified by the player. Alternatively, the set of game symbols includes integers ranging from 1 through 40, or from 1 through 60, or from 1 through 100. The game session may also be configured so that the player may modify the player selected symbols before enabling the next game event. This ability to change the player selected numbers is a significant departure from well-known keno games that adds an exciting level of player interactivity. It shall be appreciated by those skilled in the art that the greater the quantity of player selected symbols, e.g. "balls" selected, the greater the likelihood of having a match with a game selected symbol, i.e. getting a "hit". In one embodiment, the game session is paused when at least one game selected symbol picked during a game session matches at least one player selected symbol, i.e. the game session is paused when the player gets a hit.

The player initiates a game event by authorizing the performance of a chargeable action. In the interactive keno game, a chargeable action occurs when either the next ball button 126 or the autodraw button 128 is activated. The next ball button 126 engages the drawing of a single game selected symbol from the set game symbols, i.e. one "ball" is drawn at a time. The player may also initiate the game session using the autodraw button 128. The autodraw button 128 is configured to automatically select at least one game selected symbol at a time until the at least one game selected symbol matches the at least one player selected symbol. The autodraw button 128 draws at least one game selected symbol without changing the player selected symbols or the condition identified by the bet per ball meter 106. In one embodiment, the autodraw sequence is paused if there is a match between the player selected symbols and the game selected symbols, thereby providing the player with an opportunity to cash-out. Additionally, the game session may be paused manually by the player at any time. Further still, the game session may be paused when a prize is awarded to the player. The player may then determine whether to continue the game session.

In one illustrative embodiment, before activating the next ball button 126 or the autodraw button 128, the player has an opportunity to view the paytable 114. The paytable 114 may be revised during the game session, thereby giving the player an opportunity to determine if the payout is satisfactory to the player. This ability to view a paytable that is being modified on a real-time basis adds a heightened level of interactivity to the present invention because the player can use the player's skill to end the game session, thus minimizing losses or optimizing wins.

Additionally, the player may reset the game using the erase button 130. The erase button 130 begins a new game session. Finally, should the player decide that they want to quit the game, the cash-out button 132 button is activated. The cash-out button 132 transfers credits or money to the player using well-known techniques that include depositing coins in a coin hopper or transferring credits or money to a coupon that is redeemable at other machines or kiosks.

During the game session, the player may also be awarded an intermediary prize after a game event. The intermediary award may then be transferred to the credit meter 104 so that the player may apply the newly awarded credits towards continuing the game session. Preferably, the game session is paused after the intermediary prize is awarded and the player is provided with an opportunity to determine whether to continue the game session. The awarding of an intermediary prize adds a heightened level of player interactivity because the player may decide to end the game session after the intermediary prize is awarded.

Figure 4:
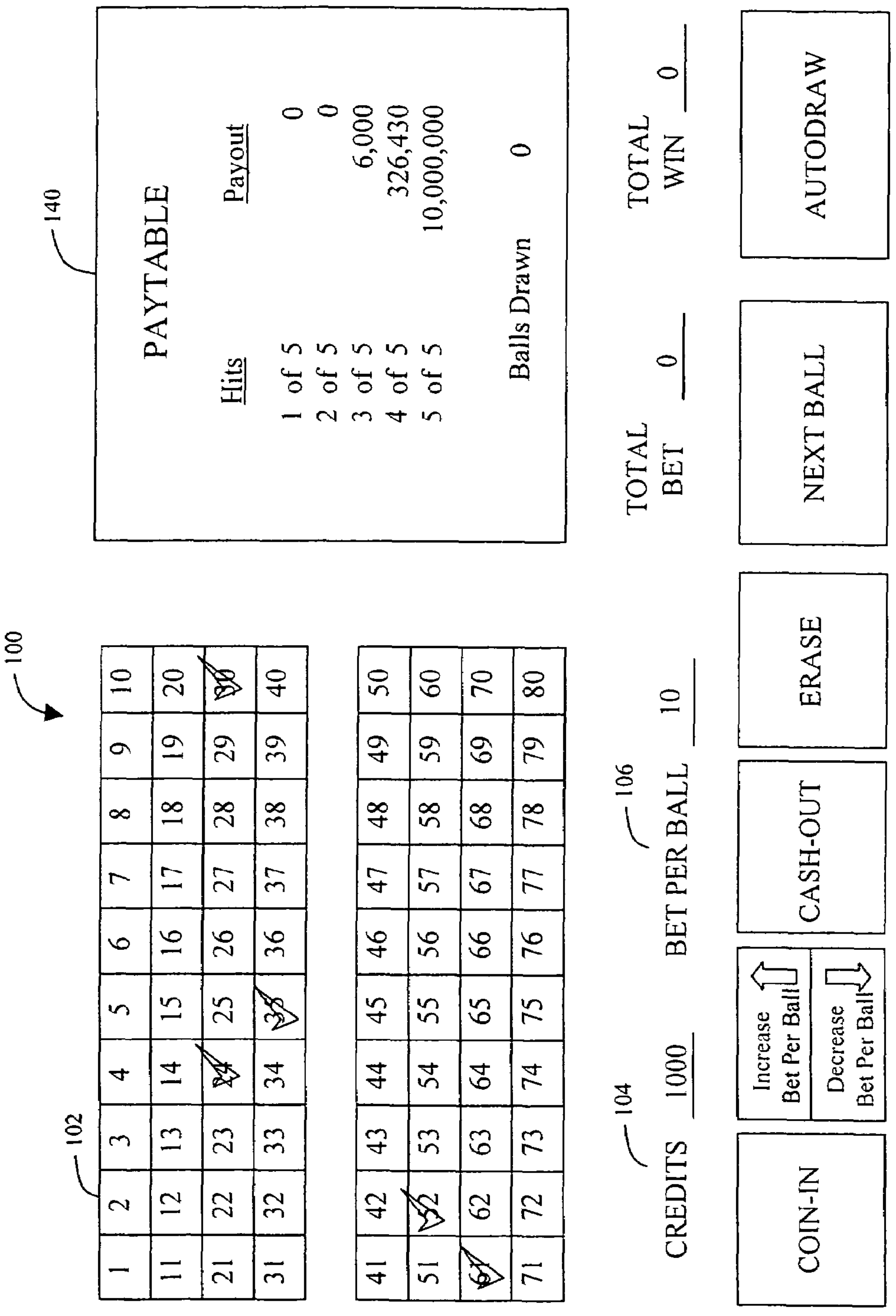
FIG. 4 shows the illustrative player interface described in which the player has initiated game play.

Referring to FIG. 4 as well as FIG. 1, there is shown the illustrative player interface described in FIG. 3 in which the player has initiated the game session. The player has initiated the game session by providing money or credits that are registered by the credit meter 104. Credit meter 104 reflects that the player has provided 1000 credits for game play. Additionally the player has entered the game condition. The game condition includes identifying the player credits in the bet per ball meter 106 that is applied for each chargeable action. The game play parameters include the player selected symbols selected from the set of game symbols. In this illustrative example, the player has selected symbols are five numbers identified by the card component 102. The five numbers selected are 24, 30, 35, 52 and 61. Each of these numbers is identified with a check mark on card component 102.

In one embodiment, after the player has picked the game selected symbols and identified the game condition with the "bet per ball" meter 106, the paytable 140 is generated. As previously described, the paytable 140 indicates the prize awarded, i.e. payout, to the player when there are matches between at least one game selected symbol and at least one player selected symbol. As shown in the illustrative example, the paytable 140 awards a prize to the player if there is a match between three or more player selected numbers and the game selected numbers.

By displaying the paytable and various meters, the interactive keno game includes a skill component that is otherwise missing in other keno games. For example, the player can view the paytable 114 to determine whether or not to continue the game session. If the player finds the payout to be too low the player may end the game session. Additionally, the player can view the number of balls drawn meter 119, the total bet meter 108 and the total win meter 110 to determine whether to continue the game session. The interactive keno game thereby provides the player with an opportunity to terminate the game session so that the game outcome is achieved at least in part due to the player's skill.

Figure 5:
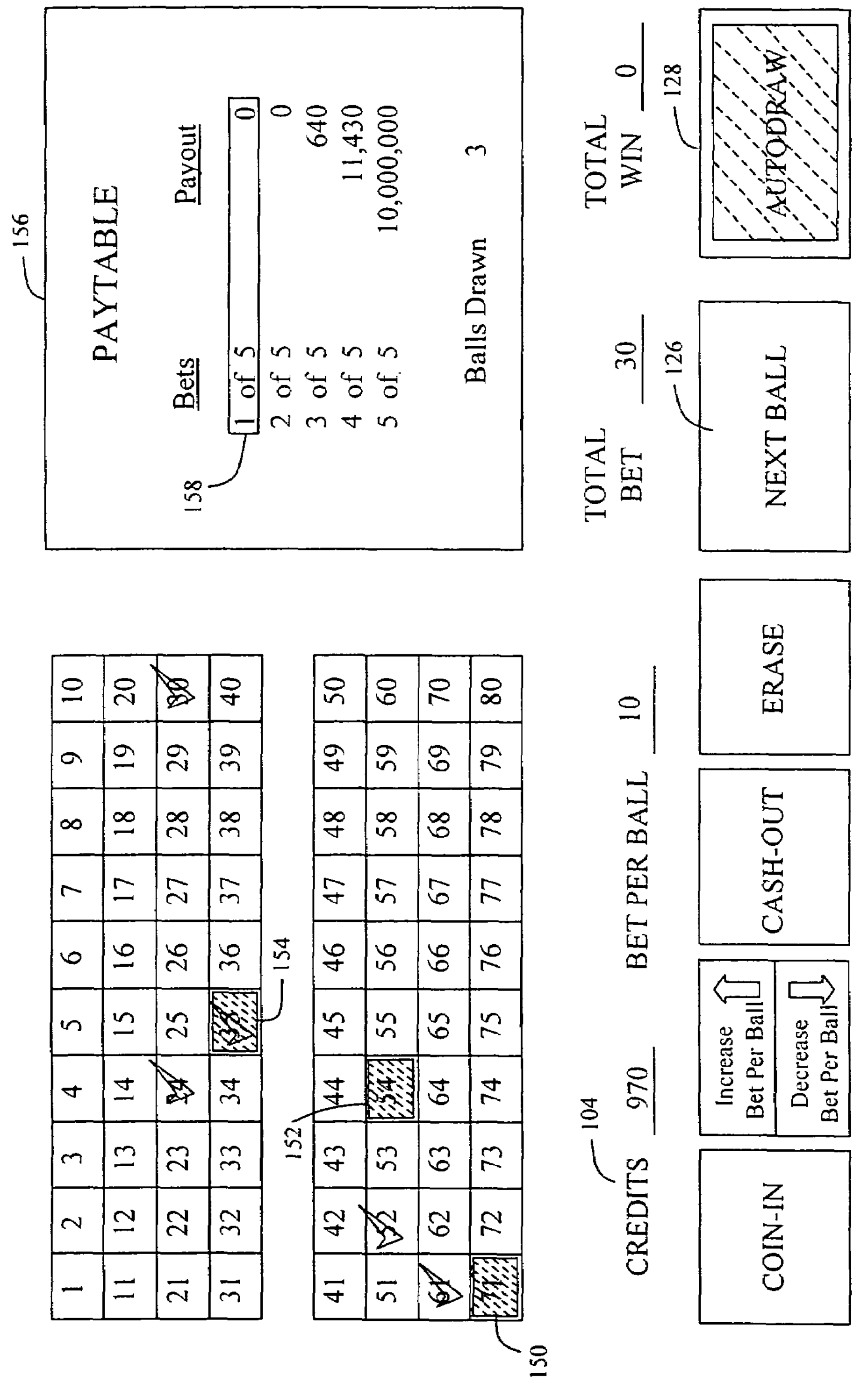
FIG. 5 shows the illustrative player interface in which random numbers are selected.

Referring to FIG. 5 as well as FIG. 3 and FIG. 4, there is shown the illustrative player interface after the autoplay button has been activated. In the illustrative embodiment, the game was paused because there was a match between the game selected symbol and one of the player selected symbols. In the illustrative example of FIG. 5, the game selected symbols are numbers 71, 54 and 35 in which the number 71 was drawn first, the number 54 was drawn second, and the number 35 was drawn third. The game selected symbols are identified with markings 150, 152, and 154 for numbers 71, 54, and 35, respectively. During each game event of this game session, the chargeable action of picking one game selected symbol required withdrawing 10 player credits from the credit meter 106. On the first drawing the game selected symbol was 71. Since there was no match with the player selected numbers, the player lost the credits and the total bet credit meter was revised to show that 10 player credits had been played. Preferably, the paytable was then revised. On the second drawing, the player wagered another 10 credits for the chargeable action of picking the next game selected symbol. In this illustrative example, he did not change his previous bet amount or the player selected numbers. The next game selected symbol was 54 and again there was no match with the player selected numbers. Again the player credits were lost and the total credit meter was revised and went from 10 to 20. Preferably, the paytable was again revised and provided the paytable output shown in paytable 156.

Since the player was in "autodraw" mode, 10 more player credits were charged to the player for the next game selected symbol. During this game event, the game selected symbol is 35 and there is a match between the game selected symbol and the player selected symbol. Since a match has been made, the player may be entitled to a payout. The paytable 156 indicates, at line 158, using the vernacular "1 of 5" that for the five numbers selected by the player, a single match entitled to the player to a payout of 0. Regretfully, the player was unable to win a prize because the game required more matching numbers. Should the next two game selected symbols match two of the four remaining player selected symbols, the player shall be entitled to an award of 640 credits according to paytable 156. Should the next three game selected symbols match three of the four player selected symbols, the player is entitled to an award of 11,430 credits. Finally, should the next four game selected symbols match the remaining four player selected symbols, the player is entitled to an award of 10,000,000 credits. Note that paytable 156 in FIG. 5 is different from paytable 114 in FIG. 3. The difference is due to the dynamic nature of the paytable.

In operation, the game session continues until the player decides to end the game, or there are no more credits available in the credit meter 104, or the game session is completed according to the game rules. Should the player decide to end the game, the player cashes out his remaining credits by using the cash-out key 132. It shall be appreciated by those skilled in the art that the game of the present invention may include additional functions such as accounting functions, player tracking functions, loyalty functions and the awarding of a progressive jackpot. By way of example and not of limitation, the progressive jackpot may be awarded by matching all player selected numbers with the randomly selected numbers according to a paytable formula for progressive jackpots.

Figure 6:
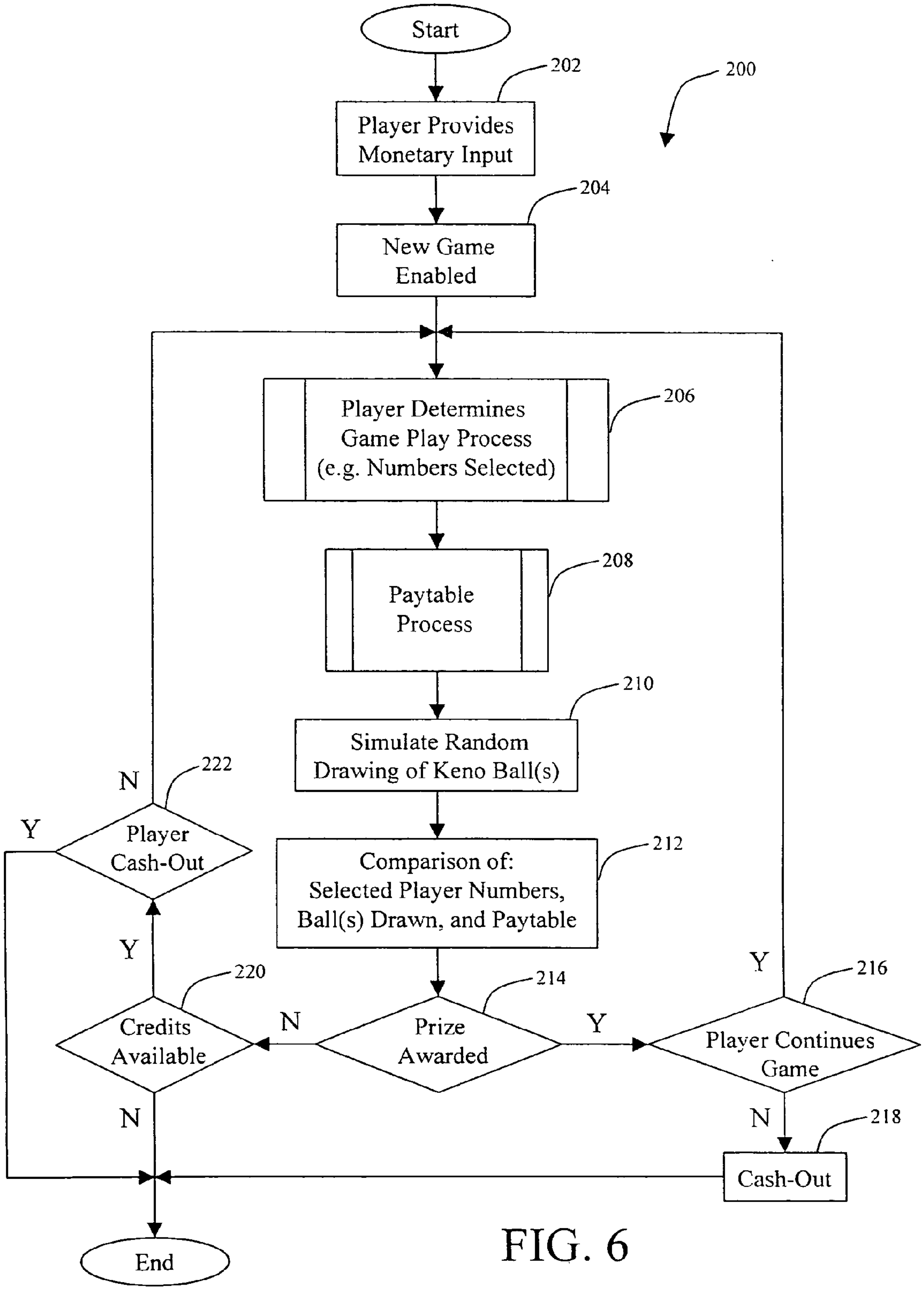
FIG. 6 is a flowchart of a method for playing the game.

FIG. 6 is a flowchart of the illustrative method for playing the interactive keno game. The method 200 for playing the interactive keno game is initiated at block 202 by having the player provide monetary input. The providing of monetary input refers to the providing money using coins or currency or the providing of transferable credits derived from coupons, a smart card, a player account, a credit account, or any other such accounts that receive credits or currency. The monetary input is needed to activate or enable the interactive keno game as described in block 204. The monetary input is also converted to player credits which are displayed in the credit meter 104 of FIG. 3 and used during a game session to perform chargeable actions as described above. Once the game session is begun the player interface 100 of FIG. 3 through FIG. 5 is enabled. In one embodiment, the player interface 100 displays a set of symbols that are integers ranging from 1 through 80. The method then proceeds to process block 206.

At process block 206 the player configures the interactive keno game play condition and the identifies the player selected symbols. Generally, the player configures the game by providing the condition that identifies the player credits that are applied for the performance of each chargeable action. As previously described, the player credits are identified by activating the increase bet per ball button 122 or the decrease bet per ball button 124 or by using a default parameter. Additionally, the player chooses at least one player selected symbol from the set of game symbols. Preferably, the player selected symbols are selected from a set of game symbols that include the integers ranging from 1 through 80, and up to 10 player selected symbols may be picked by the player. Furthermore, the player uses either the next ball button 126 or the autodraw button 128 to enable more than one game event to occur during a game session. During each game event a game selected symbol is picked as described below in process block 210. In one embodiment, the player configuration for the interactive keno game is then stored in a memory 34 or cache 35 of FIG. 1*b*. The method then proceeds to process block 208.

At process block 208 a paytable is displayed. The paytable indicates the possible prizes that may be awarded to the player. The paytable includes a dynamic paytable or a static paytable. The dynamic paytable is a paytable that is modified during the game session. By way of example and not of limitation a dynamic paytable may be modified as a function of variables that include: the number of player selected symbols; the number of matching game selected symbols; the amount of player credits played for each chargeable action; the number of chargeable actions performed; the remaining game symbols after each drawing; the total number of game symbols; and the contribution or allocation of each award level to the overall payback. The static paytable is a paytable that does not change during a game session. By way of example and not of limitation, the static paytable refers to a paytable that does not change after the player has chosen the player selected symbols.

By way of example and not of limitation, the illustrative paytables 114, 140 and 156 are configured to provide a payout for up to 10 player selected numbers. In the illustrative paytables described above each paytable is comprised of a hits column and a payout column. In one embodiment, the paytable is revised after each chargeable action. In yet another embodiment, the paytable is revised according to the total number of player credtis played during the game session. In yet a further embodiment, the paytable is revised according to a formula having a weighted probability in which the weighted probability is dependent on the total number of game selected symbols picked in the game session. Another embodiment provides for revising a paytable with a formula that uses the condition having the "Bet Per Ball" amount, the total quantity of game symbols, and the quantity of game selected symbols. The paytable indicates the prize awarded to the player for making a "hit". A hit is a match between at least one game selected symbol and at least one of the player selected symbol. The method then proceeds to block 210.

At block 210, the game selected symbols are picked. In one illustrative embodiment, a random number generator 38 simulates the drawing of keno balls by assisting in the random picking of a game selected symbol within the set of game symbols. At least one game selected symbol is picked to determine if there is a match with the player selected symbols. The choosing of at least one game selected symbol is a chargeable action. Generally, the chargeable action provides for the transfer of player credits each time at least one game selected symbol is picked.

Preferably, the game selected symbols are picked only once. In an alternative embodiment, the game selected symbols may be picked more than once because each game selected symbol is returned to the set of game symbols, so that the set of game symbols does not change. In the illustrative embodiment, each game selected symbol is stored in a memory 34 or cache 35. The method then proceeds to block 212.

At block 212 a comparison of the player selected symbols, the game selected symbols, and the paytable is performed. The purpose for performing the comparison is to determine whether there is a match between the player selected symbols and the game selected symbols. If there is a match, then the paytable is analyzed. The method then proceeds to decision diamond 214.

At decision diamond 214, it is determined whether a prize is awarded. The prize awarded is dependent on the paytable. Illustrative paytables 114, 140 and 156 are shown in FIG. 3; FIG. 4 and FIG. 5, respectively. As previously described, the player may derive a prize after at least one game selected symbol is picked. A prize is awarded if there is a match between the player selected symbols and the game selected symbols that is consistent with the appropriate paytable. If a prize is awarded then the method proceeds to decision diamond 216.

At decision diamond 216 the player must determine whether to continue the game. The determination of whether to continue the game is achieved in part by the player's skill in analyzing the paytable and the plurality of meters that monitor the interactive keno game. If the player decides to continue the game then the player returns to process block 206 and the player must configure the game session parameters prior to random selection of the next game number. If the player decides to end the game after the prize is awarded, the player cashes out by pressing the cash-out button 132.

If the player is not awarded a prize at decision diamond 214, then the method proceeds to decision diamond 220 in which the gaming device determines whether the player has sufficient credits to continue playing the interactive keno game. If the player does not have sufficient credits then the game is ended. However, if the player does have sufficient credits to play, then the player may still decide to minimize future losses by cashing out as shown in decision diamond 222. The player may make his decision based on the dynamic paytable awards and the meters that monitor the game session. Thus, the termination of the game session may be achieved at least in part by the player's skill. Should the player decide to continue the game, the player returns to block 206 to once again configure the game play parameters.

Figure 7:
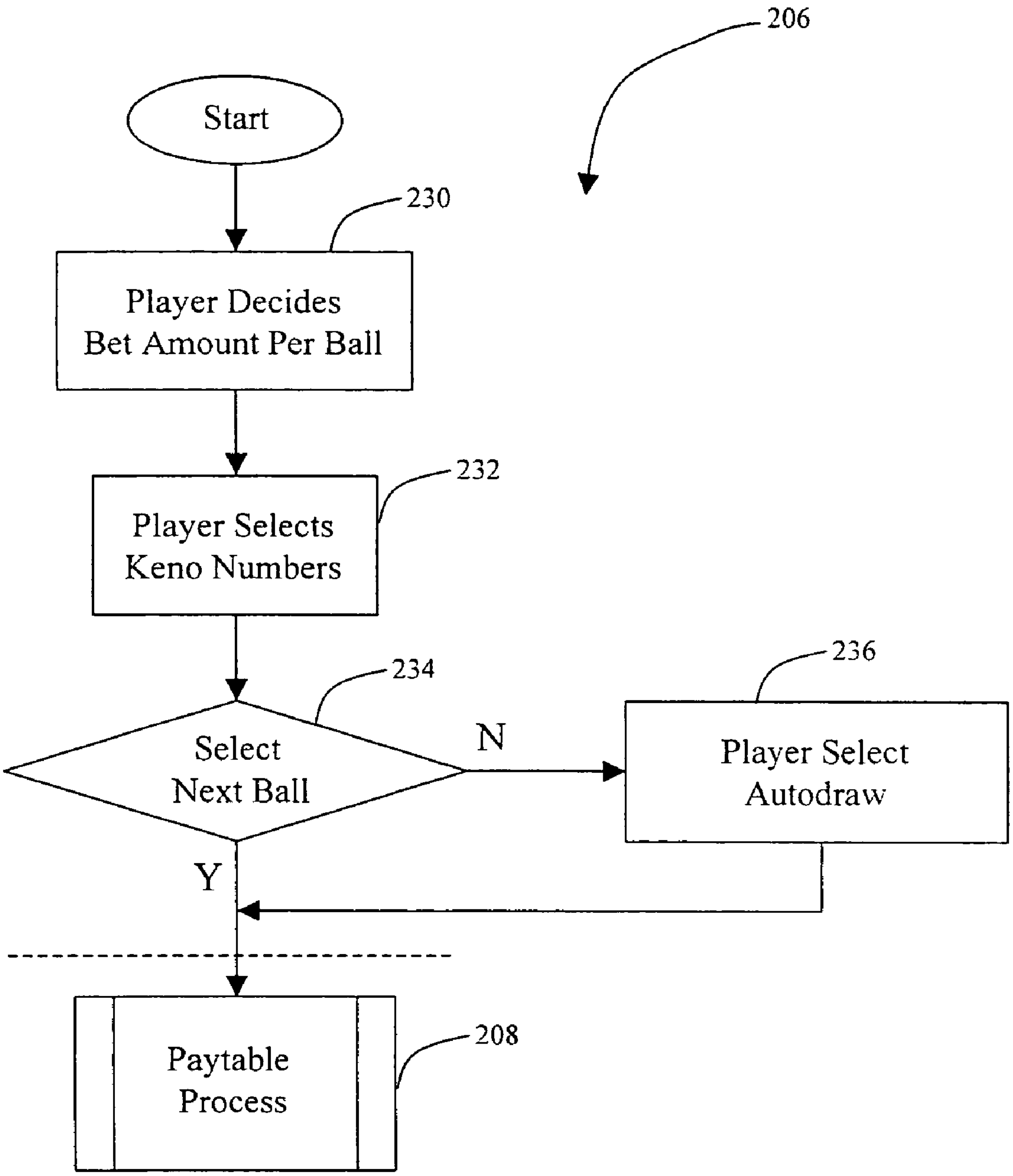
FIG. 7 is a flowchart of a process used by the player to configure the game.

FIG. 7 is a flowchart of process block 206 that is used by the player to configure the interactive keno game. The process block 206 includes the process blocks 230 through 236. At block 230, the player decides the number of player credits wagered for each chargeable action using the increase bet per ball button 122 or the decrease bet per ball button 124 or by using a default parameter. The number of credits identified is then displayed on the bet per ball meter 106. The method then proceeds to block 232.

At block 232, the player selects at least one player selected symbol from the set of game symbols. Preferably, the player selected symbols are selected from the set of game symbols that includes the integers ranging from 1 through 80. In one embodiment, up to 10 player selected symbols may be chosen by the player. Thus, by way of example and not of limitation, the player may select from 1 through 10 player selected numbers. In the example, the player selected numbers are identified on the card component 102 with a check mark as shown in FIG. 4. The method then proceeds to decision diamond 234.

At decision diamond 234 the player decides whether to activate the next ball button 126 or the autodraw button 128 to enable a chargeable action to take place. Each time a game event occurs a game selected symbol is picked and the player is charged for this "chargeable action". At decision diamond 234 the player must decide whether to activate the next ball button 126. If the player decides to activate the next ball button, then the next at least one game selected symbol is picked, and the method proceeds to the paytable process 208. However, if the player decides to not activate the next ball button 126, then the player must activate the autodraw button 128 to continue playing the game.

At block 236 the player can activate the autodraw button 128. The autodraw button 128 is configured to automatically draw at least one game selected symbol from the set of game symbols until a match is achieved. In one embodiment the autodraw button 128 draws at least one game selected symbol at a time and operates without changing the player selected symbols and the player credits identified by the bet per ball meter 106. The method then proceeds to the paytable process 208.

Figure 8:
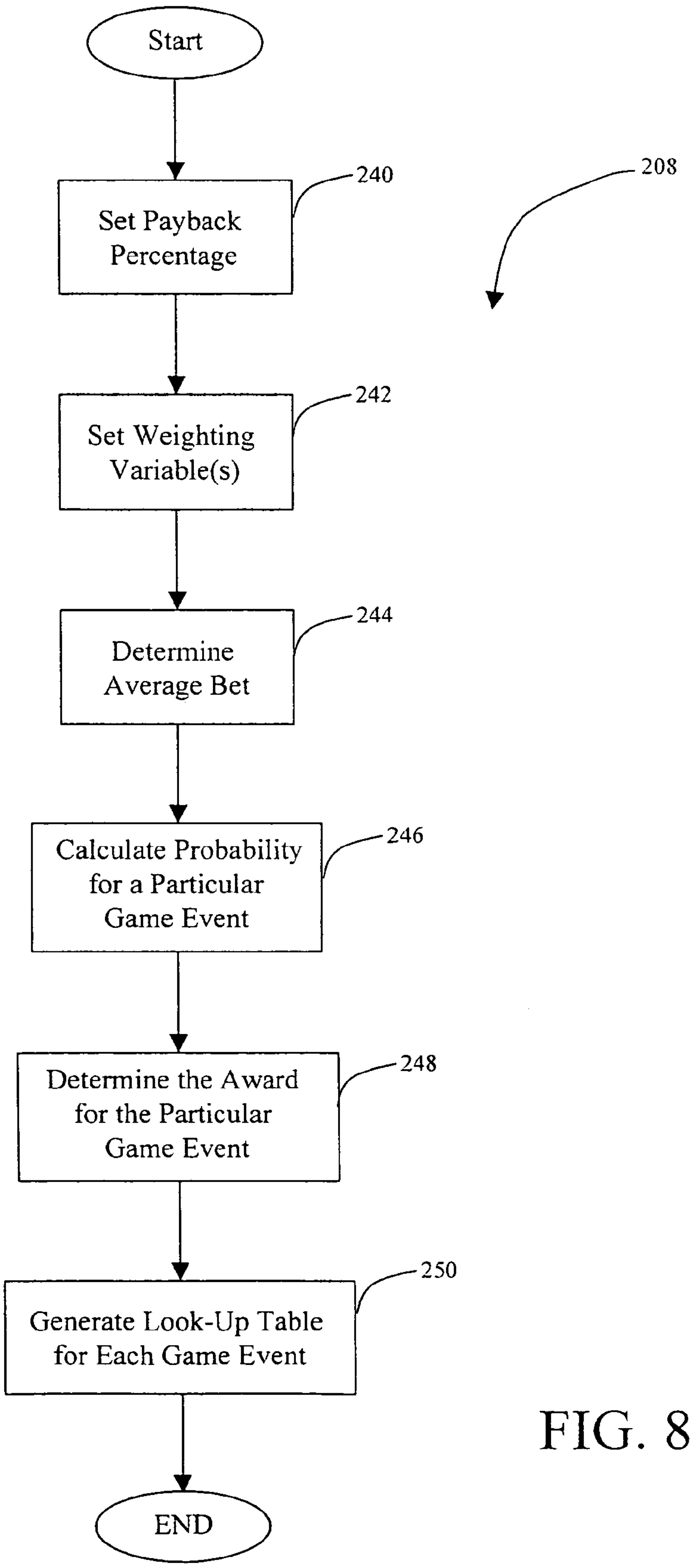
FIG. 8 is a flowchart for the paytable process.

Referring to FIG. 8 there is a flow chart showing an illustrative embodiment describing how the paytable is generated in process block 208. The paytable is the dynamic paytable that is modified during the game session. By way of example and not of limitation a dynamic paytable may be modified as a function of variables that include: the number of player selected symbols; the number of matching game selected symbols; the amount of player credits played for each chargeable action; the number of chargeable actions performed; the remaining game symbols after each drawing; the total number of game symbols; and the contribution or allocation of each award level to the overall payback. Preferably, the dynamic paytable is programmed into the interactive keno game using a plurality of look-up tables. Illustrative look-up tables for the dynamic paytable are shown in FIG. 9. In general the dynamic paytable is calculated based on the probabilities associated with the future game event, i.e. the picking of the next game selected symbol. The calculation of the future probabilities for the next game event are based on the prior game events that took place during the game session. Once the probabilities for the next game event are known, then pay amounts are calculated.

Referring to block 240, the "payback" percentage is set into the game. Preferably, the pay amounts distributed to the player provides a "payback" that remains constant. By way of example and not of limitation, the paytable may be programmed to provide a constant 96% payback to the player. In the illustrative example, the dynamic paytable is programmed to provide a constant payback in spite of the changing probabilities. Generally, the payback percentage for the interactive keno game is determined by the operator, e.g. a casino. For purposes of this disclosure, the payback percentage is referred to as ROI. The method then proceeds to block 242.

At block 242 the weighting variables are set. In one illustrative embodiment an arbitrary weighting function is chosen. The arbitrary weighting function may be used to more heavily weight the probabilities associated with the game selected symbols that are picked at the end of the game session. By way of example, the weighting function may be a formula as shown below:

$$WGT(I)=(I+39)/80$$

The variable "I" in the weighting function refers to the quantity of game selected symbols. Thus, if only one game selected symbol is, picked the arbitrary weighting function is 0.50, and if sixty-one game selected symbols are picked the arbitrary weighting function is 1.25.

Another weighting function that may also be used to develop the dynamic paytable includes an allocation weighting function. The allocation weighting function determines the percentage of the total prize awarded for each match of the game selected symbols and the player selected symbols. By way of example and not of limitation, if the total prize awarded is 1.0, then for a game in which the player has chosen four player selected symbols, a 0.4 value may be allocated for a match. For the game in which the player has chosen three of the four player selected symbols a 0.6 value may be allocated for a match with four of the four player selected symbols. The allocation weighting function is needed because of the dependent nature of the events in the interactive keno game. More particularly, the dependent nature of the game is due to the future game event probabilities being dependent on the prior game event during the game session. For purposes of this disclosure, the allocation weighting function is referred to as AL(IHIT). The method then proceeds to block 244.

At block 244, the average bet is determined based on the structure of the game. The average bet may be determined empirically or theoretically. The average bet is a function of the quantity of player selected symbols. For purposes of this disclosure the average bet is referred to as ABET. The method then proceeds to block 246.

At block 246, the probability for the next game event is calculated. The probability of a next game event is the product of probabilities of prior game events multiplied by the probability associated with the next game event. For purposes of this disclosure, the probability for the next game event is referred to as PR(I). The method then proceeds to block 248.

At block 248, the award for the each game event is determined. The award is given by the illustrative equation provided below:

$$PAY(I)=ROI*ABET*WGT(I)*AL(IHIT)/PR(I)$$

For purposes of this disclosure the award provided to the player is referred to as PAY (I). The method then proceeds to block 250.

At block 250, a plurality of look-up tables are generated for each game event. As shown above, an award is calculated for each game selected symbol. The award is based on when the game selected symbol was picked, i.e. was the game selected symbol that matched the player selected picked during the first drawing, second drawing, third drawing, etc. Thus, a look-up paytable is generated for the matching of the first game selected symbol, the second game selected symbol, etc. In the illustrative embodiment having the game selected symbols ranging from 1 through 80, the paytable is provided for the first ball drawn in which the game selected symbol matches the player selected symbol.

Referring to FIG. 9 as well as FIG. 8, there is shown three illustrative look-up paytables that are generated using the method described in FIG. 8. A table 260 is associated with the game selected symbol, i.e. first ball, being picked and matching one of the player selected symbols. The table 260 includes a column that identifies the type of keno game being played, e.g. 1-Spot, 2-Spot, etc. The 1-Spot game is a game in which the player has chosen only one player selected symbol. The table 260 also includes a row that identifies the number of hits. As previously mentioned a "hit" occurs when the player selected number matches the game selected number. The table 260 indicates that after the first game selected number is picked, in a game in which the player has chosen only one player selected symbol, and there is a match between the game selected symbol and player selected symbol, the player is entitled to an award of 20 credits.

The table 270 is an illustrative look-up paytable associated with the second game selected symbol picked from the set of game symbols that matches at least one player selected symbol. The table 280 is an illustrative look-up paytable associated with the third game selected symbol matching at least one player selected symbol.

CONCLUSION

It can now be seen that the present invention provides an interactive keno game in which a player identifies the player credits to be applied prior to the drawing of the at least one game selected symbol, e.g. the next keno ball. The interactive nature of the game is created by providing an environment where the player can control at least three game parameters: the player selected symbols, the number of player credits for each chargeable action, and the opportunity to determine whether to continue the game session.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of operating an interactive game that comprises: receiving from a player at least one player selected symbol during a game session; receiving from said player at least one player credit for each chargeable action performed during said game session; performing a plurality of chargeable actions wherein each chargeable action comprises having said interactive game pick at least one game selected symbol from a set of game symbols and charging said player said at least one player credit; providing a dynamic paytable that evaluates awarding a prize when said at least one player selected symbol matches said at least one game selected symbol; modifying said dynamic paytable after performing each chargeable action; and permitting said player to terminate said game session so that said player's skill in considering said dynamic paytable affects said game session outcome.

2. The method of claim 1 wherein said at least one player selected symbol is selected from a set of numbers.

3. The method of claim 2 wherein said at least one game selected symbol is selected from said set of numbers.

4. The method of claim 3 wherein said set of game symbols comprises said set of numbers.

5. The method of claim 4 wherein said set of numbers includes a plurality of integers.

6. The method of claim 5 wherein said set of numbers comprises less than 100 integers.

7. The method of claim 1 further comprising modifying said dynamic paytable according to a total number of player credits played during said game session.

8. The method of claim 1 further comprising modifying said dynamic paytable according to a formula having a weighted probability, said weighted probability dependent on a total number of game selected symbols picked during said game session.

9. The method of claim 1 further comprising awarding an intermediary prize of a plurality of additional credits when said at least one game selected symbol matches said at least one player selected symbol.

10. The method of claim 9 further comprising permitting said additional credits to be used by said player during said game session.

11. A method for operating an interactive keno gaming system, comprising: receiving at least one player selected integer during a game session; receiving at least one player credit for each chargeable action performed during said game session; performing a plurality of chargeable actions wherein each chargeable action comprises having said interactive game pick at least one game selected integer from a set of game integers and charging said at least one player credit; providing a dynamic paytable that evaluates awarding a prize when said at least one player selected integer matches said at least one game selected integer; modifying said dynamic paytable after performing each chargeable action; and permitting termination of said game session after each chargeable action is performed.

12. The method of claim 11 wherein said set of game integers comprises less than 100 integers.

13. The method of claim 11 further comprising modifying said dynamic paytable according to a total number of player credits played during said game session.

14. The method of claim 11 further comprising modifying said dynamic paytable according to a formula having a weighted probability, said weighted probability dependent on a total number of game selected integers picked during said game session.

15. The method of claim 11 further comprising awarding an intermediary prize of a plurality of additional credits when said at least one game selected integer matches said at least one player selected integer.

16. The method of claim 15 further comprising permitting said additional credits to be used during said game session.

17. An interactive gaming system comprising, a display configured to display an interactive game;

a player interface configured to permit interaction with said interactive game by permitting selection of at least one player selected symbol comprising at least one player selected integer from a set of game symbols during a game session;

a first meter that identifies one or more credits charged for at least one chargeable action wherein the at least one chargeable action comprises having said interactive game pick at least one game selected symbol from said set of game symbols and charging at least one player credit;

a dynamic paytable that evaluates awarding a prize when said at least one player selected symbol matches said at least one game selected symbol, said dynamic paytable configured to be modified after the at least one chargeable action; and a button that permits termination of said game session after the at least one chargeable action is performed.

18. The system of claim 17 wherein said set of symbols comprises less than 100 integers.

19. The system of claim 17 further comprising an intermediary prize that awards a plurality of additional credits when said at least one game selected symbol matches said at least one player selected symbol.

20. The system of claim 19 wherein said plurality of additional credits awarded by said intermediary prize may be used to extend said game session.

* * * * *